March 23, 1948.    R. M. STORER    2,438,260
ICE TRAY AND GRID ARRANGEMENT
Filed Jan. 21, 1936
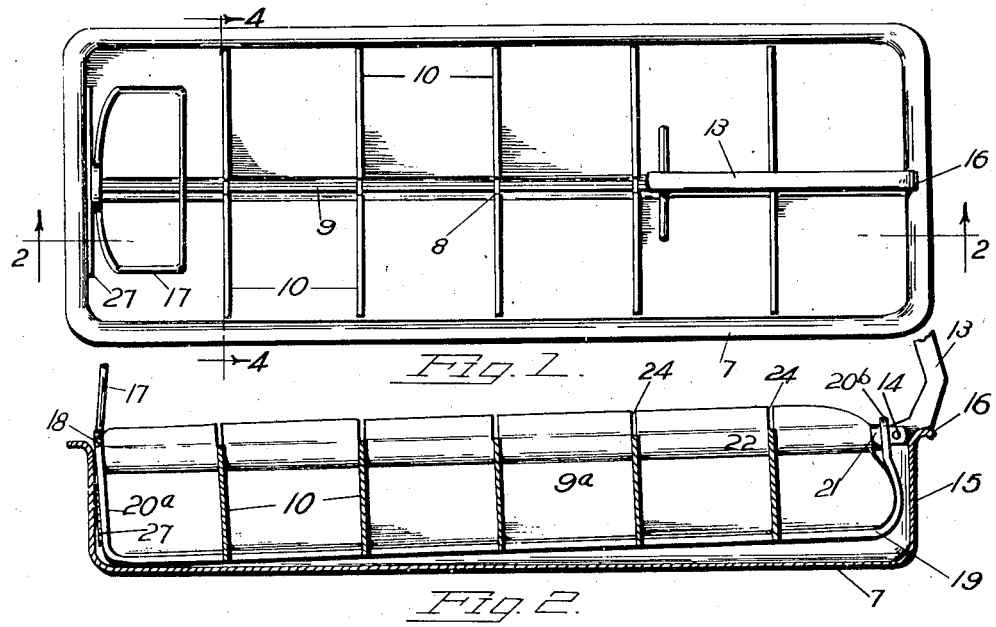
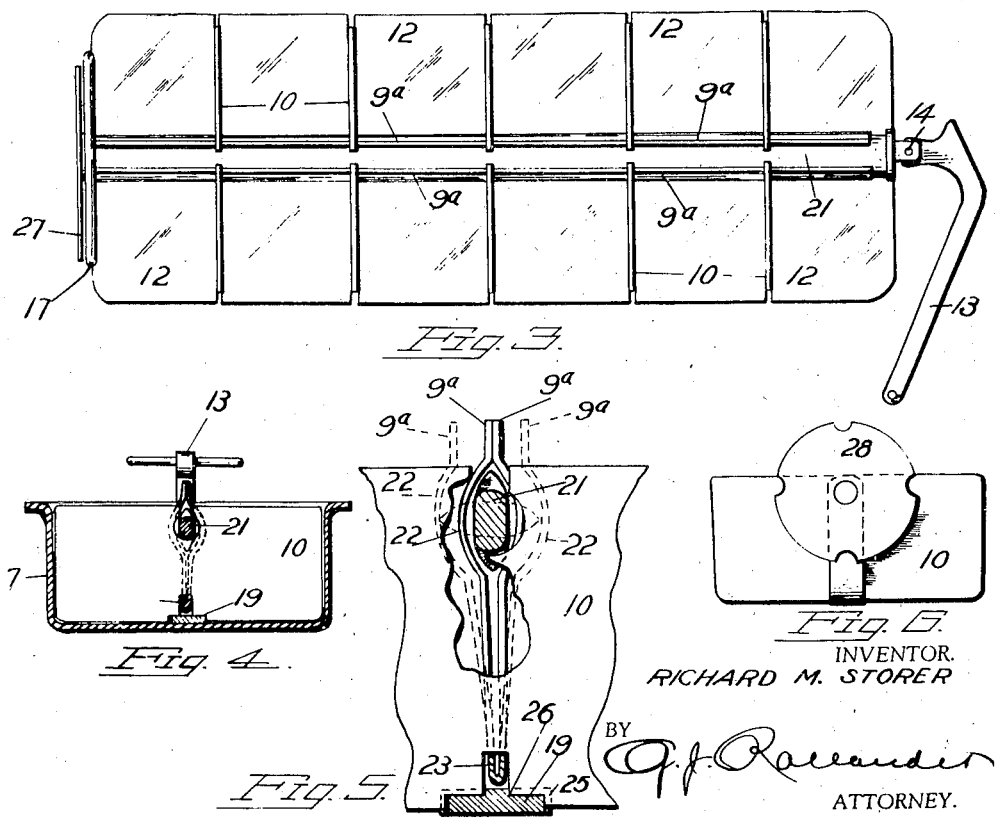
INVENTOR.
RICHARD M. STORER
ATTORNEY.

Patented Mar. 23, 1948

2,438,260

UNITED STATES PATENT OFFICE 2,438,260

ICE TRAY AND GRID ARRANGEMENT

Richard M. Storer, Denver, Colo., assignor to General Motors Corporation, Dayton, Ohio, a corporation of Delaware Application January 21, 1936, Serial No. 60,074

17 Claims. (Cl. 62—108.5)

This invention relates to improvements in molds for freezing liquids or semi-liquids of the type used in domestic refrigeration, its principal object being to provide a mold of simple construction which will facilitate removal of frozen substances from the parts included in the mold.

The present invention relates more particularly to molds of the general character disclosed in my United States Patents Nos. 1,824,308 and 1,824,309, issued on the 22d of September 1931, and it is a further object of the invention to provide certain variations of construction with reference to the disclosure of said patents, which involve a different method of operation in the use of the molds.

In the structure shown in the patents, a mold member is adapted to be fitted in a tray member, and means comprising a lever is provided on one of said members in a position to engage and exert a leverage against the other of said members for their separation from each other.

The present invention utilizes the lever arrangement of the said patents for the separation of the mold from the tray, and it is also an object of the present invention to provide means for dislodging the frozen substance from the mold after the mold has been removed from the tray.

Another object of the present invention resides in the provision of a single mechanism which is effective for separating a mold and its frozen contents from a tray and which has the further function of dislodging the frozen contents from the mold after its separation from the tray.

A further object of the invention is the provision of means for directing a force simultaneously against all the frozen objects in a mold whereby all said objects are ejected from the mold in a single operation.

Still another object of the invention is the provision of a mold which is of simple construction, durable, and efficient in operation.

Still further objects reside in details of construction and in novel combinations and arrangements of parts, as will more fully appear in the course of the following description.

In the drawings, in which like characters designate similar parts throughout the several views:

Figure 1 represents a plan view of an embodiment of the present invention;

Figure 2 is a section taken along the line 2—2, Figure 1, with the lever in an elevated position to illustrate the separation of the mold from the tray;

Figure 3 is a plan view of the mold with the lever in an actuating position, to illustrate the manner in which frozen material is dislodged from the mold;

Figure 4 is a section taken along the line 4—4, Figure 1;

Figure 5 is an enlarged fragmentary section similar to Figure 4, and partially broken to more clearly illustrate the mold construction; and Figure 6 is an end elevation of another embodiment of the invention.

Referring more specifically to the drawings, the reference numeral 7 designates the pan or tray of any well known type used in domestic refrigerating units.

A mold or grid 8 is designed to be fitted in the tray 7, and consists of a frame 9 which extends in a lengthwise direction in the tray 7 and carries a plurality of transversely ranging spacers 10, in the form of plates of metal, rubber, Bakelite or the like. The frame and spacers divide the tray into a series of freezing compartments, in which blocks of ice 12 or other frozen matter are formed when the assembly is placed in the freezing chamber of a domestic refrigerating unit, or other source of heat withdrawal.

The expansion of the liquid or semi-liquid in the tray during freezing, makes the subsequent separation of mold and grid difficult, and to facilitate removal, the grid is provided with a lever 13, pivoted at 14 so that it may be folded to a position in which it reclines on the upper edge of frame 9, and which may be elevated to a position in which it bears against an end wall 15 of the tray, as shown at 16 in Figure 2, whereupon the lever exerts a leverage which is effective to separate the mold and its frozen contents from the tray.

If desired, a handle or grip 17 may be fixed on the opposite end of the frame to facilitate lifting of the mold from the tray after the lever has been actuated. In the preferred embodiment, the handle 17 is pivoted at 18 to permit its being moved to a reclining position on frame 9.

When the handle 17 and lever 13 are in the reclining positions illustrated in Figure 1, it will be readily apparent that the assembly makes a compact unit for insertion in the freezing compartment of a domestic refrigerating unit.

The frame 9 of the mold 8 functions as a pressure-member to direct a force against the frozen material, which is effective in dislodging such material from adhesive contact with the elements of the grid.

In its preferred form, the frame 9 consists of a support 19 terminating at both ends in upright extensions 20a and 20b. A rod 21 is journalled in the extensions and at one end extends through the extension 20b, and terminates in a bifurcation in which the lever 13 is fitted and pivoted on a pin 14, as shown in Figures 2 and 3.

The rod is preferably of a cross sectional area of greater thickness in one dimension than in the other, and is normally disposed with its greatest thickness in a vertical position as illustrated in the solid line construction in Figure 5.

Complementary walls 9a embrace the rod and are outwardly bowed as indicated at 22, to permit the upper faces of walls 9a to contact when the rod is in its normal position. The walls 9a are preferably formed from a single piece of metal, folded as indicated at 23 in Figure 5, to provide a spring action which insures return of the walls to a contacting position after termination of a spreading force.

When the rod 21 is rotated by turning lever 13 to the position shown in Figure 3, the walls 9a are spread as shown in the dotted line positions in Figure 5 and ice blocks 12 (Figure 3) are dislodged from adhesive contact with the various surfaces of the grid 8.

The walls 9a are provided with complementary slots 24 at intervals throughout their length, and the support 19 has its upper surface slotted in corresponding intervals as indicated at 25. Spacers 10 in the form of flat plates, preferably of metal or other rigid material extend through the complementary slot 24, and together with the walls 9a divide the tray into compartments.

To prevent displacement of the plates 10 in the slots 24, the plates are recessed at 26 in order that they may straddle the support 19, with the arched portion over each recess fitted in one of the slots 25.

From the foregoing, it will be apparent that when ice or other frozen matter has formed in mold 8 and the tray 7 has been removed from the freezing compartment, the mold and its frozen contents may be readily separated from the tray 7 by elevating the lever 13 in the manner indicated in Figure 2.

To further facilitate separation and removal of the mold, laterally ranging wings 27 may be secured on upright extension 20a, to provide a greater bearing surface to be acted on by the leverage imparted by lever 13.

After the prying action has been employed, the mold 8 is lifted from the tray. Thereafter, by turning lever 13, the rod 21 may be rotated with the result that the walls 9a are spread, applying a force simultaneously against all the blocks of ice in the mold at a point near their tops to cause tilting thereof within the compartments.

The same principle may be utilized in trays in which the lever 13 is not used. Any grips, such as the knurled screw 28 shown in Figure 6 may be fixed on the rod 21 to facilitate rotation of the same. If desired, the screw 28 may be mounted on the rod 21, so that it is disposed exteriorly of the end wall 15 of tray 7 when the mold is in position in the tray. When this arrangement is employed, the rod is disposed at an elevation above the normal liquid level in tray 7.

From the foregoing it will be apparent that the essentials of the present structure are one or more movable elements disposed in engagement with the liquid during freezing and capable of being moved by a manually-operable element to exert a leverage on the frozen material.

For example, in place of the two movable plates shown in the drawings, a single partition mounted for rotation on a shaft corresponding to the rod 21 of the drawings, could be rotated sufficiently after the material was frozen to effectively dislodge the blocks.

Also, a fixed partition might be used which would be apertured adjacent a shaft or rod, which would have projections in register with the apertures, and by rotation of the shaft the projecting portions will exert sufficient leverage to dislodge the frozen blocks.

When the two movable walls and the spreading action are employed, it is not necessary that the walls be formed of a single piece of material. Separate walls may be used by connecting them at their lower edges and using a spring clip or similar device for effecting a return after the sides are spread.

Likewise metal is not an essential in the construction. The grid walls may be constructed of Bakelite or similar compositions. The grid walls or spacers may be produced from any type of material. Rigid materials such as metal, Bakelite or the like will probably be most effective, but more flexible substances such as rubber or plastics and the like may be used if desired.

Changes and modifications may be availed of within the spirit and scope of the invention as defined in the hereunto appended claims.

What I claim and desire to secure by Letters Patent is:

1. In a device of the character described, a grid comprising a support, a rod mounted for rotation on the support, a plate on the rod, and a partition fixed on the support in a position to project laterally from the plate and cooperating with the plate to define a plurality of freezing compartments, the plate being movable by rotation of the rod to impart a thrust against frozen matter in the compartments.

2. In a device of the character described, a grid comprising a movable plate, a partition projecting laterally from the plate, and cooperating with the plate to define a plurality of freezing compartments, and a rotatable cam bearing on the plate throughout its length for moving the same to impart a thrust against frozen matter in the compartments.

3. In a device of the character described, a grid comprising a support, a rod mounted for rotation on the support, two complementary resilient walls embracing the rod, a partition projecting laterally from the walls and cooperating with the walls to define a plurality of freezing compartments, and means for manual rotation of the rod, the rod acting on the walls during its rotation to spread the same a substantially uniform distance throughout their lengths.

4. A device of the character described, comprising a tray and a mold normally fitted in the tray, a lever located on the mold member in a position to engage and exert a leverage against the tray for facilitating separation of the mold from the tray, and an element operable by rotation of the lever for exerting a leverage against frozen matter in the mold.

5. A device of the character described, comprising a tray, and a mold normally fitted in the tray and including two complementary, relatively movable walls, a shaft between said walls in engagement therewith, and a lever carried on the shaft in a position to engage and exert a leverage against the tray for facilitating separation of the mold from the tray, the shaft being effective for spreading the walls during its rotation through the intermediary of the lever.

6. In a device of the character described, a tray for the reception of matter to be frozen, a grid in the tray adapted to form a plurality of molds, cam means for expanding portions of said grid, and a lever contacting the tray and operatively connected with the cam means for inducing the expanding movement thereof and disposed to exert leverage against a surface of the tray for the separation of the grid from the tray.

7. In a device of the character described, a grid including a longitudinal wall and a plurality of transverse walls, said longitudinal wall comprising substantially contiguous sheet metal portions, means extending longitudinally between said sheet metal portions, and means for operating said first named means to move said sheet metal portions a predetermined distance away from one another, said last named means being constructed and arranged to cause said predetermined movement of said sheet metal portions to be uniform throughout their lengths.

8. In a device of the character described, a grid including a longitudinal wall and a plurality of transverse walls, said longitudinal wall comprising substantially contiguous sheet metal portions, cam means extending longitudinally between said sheet metal portions along the tops thereof, and means for operating said cam means to move at least the upper parts of said sheet metal portions a predetermined distance away from one another, said cam means being constructed and arranged to cause said predetermined movement of said sheet metal portions to be uniform throughout their lengths.

9. A device of the character described, comprising a tray, a mold in the tray, a lever for separating the mold from the tray by a movement of the lever in one direction, and an element operable by another movement of the lever in a different direction for exerting a dislodging action on frozen matter in the mold.

10. A device of the character described comprising, a tray, a mold therein, having three walls defining an open-ended compartment, a lever for separating the mold from the tray by movement of the lever in one direction, and an element operable by another movement of the lever in a different direction for moving one wall of the compartment relative to its other walls, whereby to exert a dislodging action on frozen matter therein.

11. In a device of the character described, a grid comprising a centrally arranged elongated element and a plurality of spacers extending transversely of the element, the element being composed of two relatively movable walls, a rotatable rod of greater thickness in one dimension than in another and extending lengthwise of the walls between the same, and means on the rod for manual rotation of the same to spread the walls.

12. A unitary metallic grid structure for disposition in a freezing tray and removable therefrom as a unit, said grid structure comprising a longitudinal wall member and a plurality of substantially non-flexible transverse wall members each extending continuously from one side of said grid structure to the other through the plane of said longitudinal wall member and being interlocked therewith to form a permanent unitary structure having a row of ice block compartments on each side of the longitudinal wall member, the longitudinal wall member and the cross members being mounted to permit movement of one member relative to the other members in said unitary structure, and mechanism for imparting such relative movement to said wall members.

13. A unitary grid structure for disposition in a freezing tray and removable therefrom as a unit, said grid structure comprising a longitudinal wall member and a plurality of spaced apart separate and independent one-piece transverse wall members extending continuously from one side of said grid structure to the other and being interlocked with the longitudinal wall member to provide a permanent unitary structure forming ice block compartments within the tray, the mounting of said longitudinal wall member and said transverse wall members being so constructed and arranged as to permit movement of one of said members relative to another of said members in said unitary structure, and mechanism for imparting such relative movement to said wall members.

14. A grid structure of the character defined in claim 13 wherein the mechanism for imparting the relative movement to said wall members includes a lever carried by the grid.

15. A unitary grid structure for disposition in a freezing tray and removable therefrom as a unit, said grid structure comprising a longitudinal wall member and a plurality of one-piece wall members extending transversely through the plane of said longitudinal wall member interlocked and connected therewith to provide a permanent unitary structure forming ice block compartments within the tray, the interlocked connection between said wall members being so constructed and arranged as to permit angular movement of one of said members relative to another of said members within a plane bounded by the top and bottom of said grid structure, and mechanism for imparting said angular movement to said one grid wall member.

16. A grid structure of the character defined in claim 15 wherein the mechanism for imparting angular movement to said one wall member includes a lever carried by the grid.

17. A grid for a freezing tray, said grid comprising a longitudinal partition, a plurality of one-piece walls each individually interlocked with said partition and extending transversely through the vertical plane thereof to form a permanent unitary removable grid structure, said one-piece walls being spaced apart along the length of said longitudinal partition to define rows of ice block compartments, and means movable relative to and carried by said grid structure and cooperating therewith for mechanically ejecting ice blocks from said compartments.

RICHARD M. STORER.

REFERENCES CITED

The following references are of record in the file of this patent:

UNITED STATES PATENTS

| Number | Name | Date |
|---|---|---|
| Re. 20,693 | Kisselle | Apr. 12, 1938 |
| 1,870,370 | Merchant | Aug. 9, 1932 |
| 1,879,400 | Mitchell | Sept. 27, 1932 |
| 1,935,405 | Layner | Nov. 14, 1933 |
| 1,940,680 | Geyer | Dec. 26, 1933 |
| 2,009,802 | Hallock | July 30, 1935 |
| 2,009,803 | Hallock | July 30, 1935 |
| 2,037,516 | Leynor et al. | Apr. 14, 1936 |
| 2,043,881 | Buchanan | June 9, 1936 |
| 2,045,371 | Roberts | June 23, 1936 |

FOREIGN PATENTS

| Number | Country | Date |
|---|---|---|
| 422,541 | Great Britain | Jan. 8, 1935 |